(12) United States Patent
Han et al.

(10) Patent No.: US 7,634,769 B2
(45) Date of Patent: Dec. 15, 2009

(54) METHOD AND APPARATUS FOR REMOTELY PROVIDING DRIVER INFORMATION

(75) Inventors: Jae-wook Han, Seongnam-si (KR); Kwang-ho Song, Seongnam-si (KR); Young-chan Yun, Kyeongsangnam-do (KR); Jong-youl Hwang, Goyang-si (KR)

(73) Assignee: Samsung Digital Imaging Co., Ltd., Suwon-si (KR)

( * ) Notice: Subject to any disclaimer, the term of this patent is extended or adjusted under 35 U.S.C. 154(b) by 1076 days.

(21) Appl. No.: 10/898,121

(22) Filed: Jul. 23, 2004

(65) Prior Publication Data
US 2005/0209871 A1 Sep. 22, 2005

(30) Foreign Application Priority Data
Mar. 17, 2004 (KR) .......................... 2004-0018143

(51) Int. Cl.
G06F 9/44 (2006.01)
G06F 9/445 (2006.01)
G06F 15/16 (2006.01)

(52) U.S. Cl. ........................ 717/168; 717/176; 709/202
(58) Field of Classification Search ................. 717/173, 717/169, 171, 172, 175, 176, 177, 178, 168; 709/202
See application file for complete search history.

(56) References Cited

U.S. PATENT DOCUMENTS

| | | | | |
|---|---|---|---|---|
| 5,953,533 A | * | 9/1999 | Fink et al. | 717/175 |
| 6,151,643 A | * | 11/2000 | Cheng et al. | 710/36 |
| 6,282,711 B1 | * | 8/2001 | Halpern et al. | 717/175 |
| 6,324,691 B1 | * | 11/2001 | Gazdik | 717/178 |
| 6,493,871 B1 | * | 12/2002 | McGuire et al. | 717/173 |
| 6,618,857 B1 | * | 9/2003 | Zimniewicz et al. | 717/175 |
| 7,080,371 B1 | * | 7/2006 | Arnaiz et al. | 717/170 |
| 2002/0184373 A1 | * | 12/2002 | Maes | 709/228 |
| 2004/0015942 A1 | * | 1/2004 | Branson et al. | 717/168 |
| 2004/0030741 A1 | * | 2/2004 | Wolton et al. | 709/202 |
| 2004/0158817 A1 | * | 8/2004 | Okachi et al. | 717/122 |
| 2004/0210893 A1 | * | 10/2004 | Chamberlain et al. | 717/168 |
| 2005/0071838 A1 | * | 3/2005 | Hatasaki | 717/168 |

FOREIGN PATENT DOCUMENTS

| | | |
|---|---|---|
| CN | 1273389 A | 11/2000 |
| CN | 1383063 A | 12/2002 |
| CN | 1400528 A | 3/2003 |

\* cited by examiner

*Primary Examiner*—Wei Y Zhen
*Assistant Examiner*—Chih-Ching Chow
(74) *Attorney, Agent, or Firm*—Drinker Biddle & Reath LLP

(57) ABSTRACT

Provided is a method and apparatus for remotely providing driver information regarding a product communicatively linked to a computer. The remote control apparatus generates information regarding drivers necessary for running the product based on received information regarding the product and system information of the computer. The remote control apparatus fetches information regarding drivers installed in the computer in response to a control signal, compares the generated driver information with the retrieved driver information, and transmits to the computer at least one of information regarding drivers not installed in the computer and necessary for running the product and a command for deleting information regarding drivers installed in the computer and unnecessary for running the product, based on the result of the comparison. This allows the computer to obtain information regarding optimal drivers for running the product.

24 Claims, 11 Drawing Sheets

FIG. 9
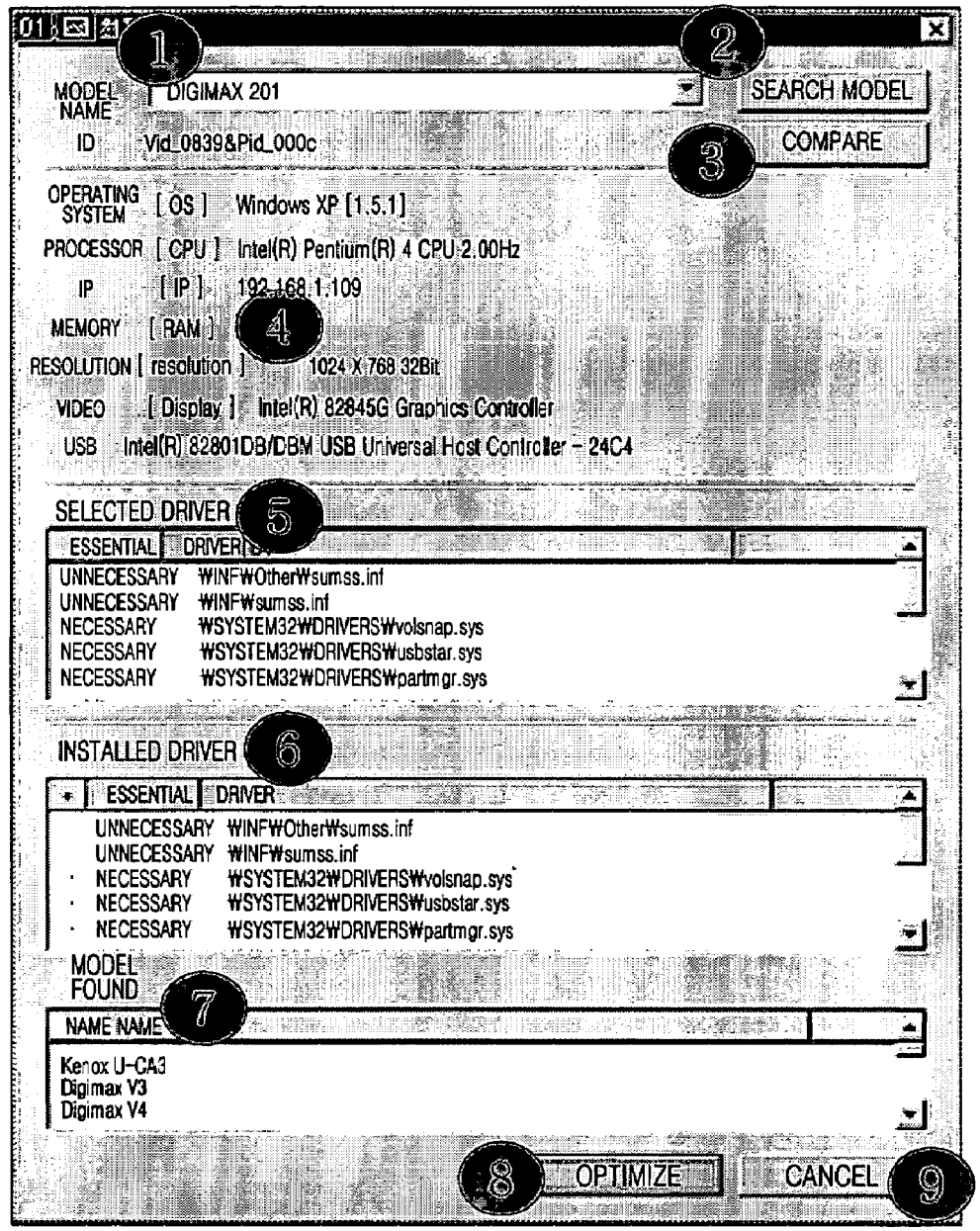
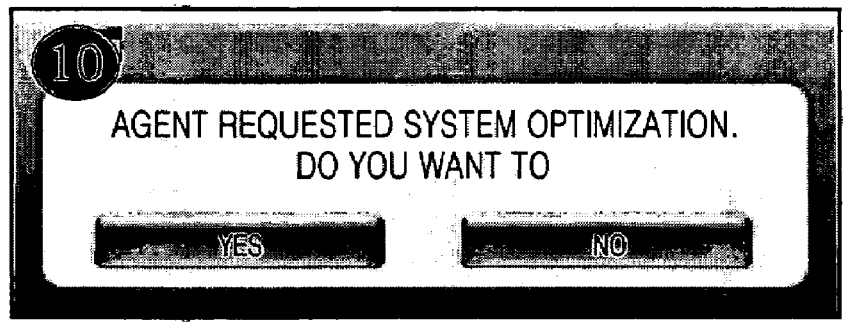

FIG. 13
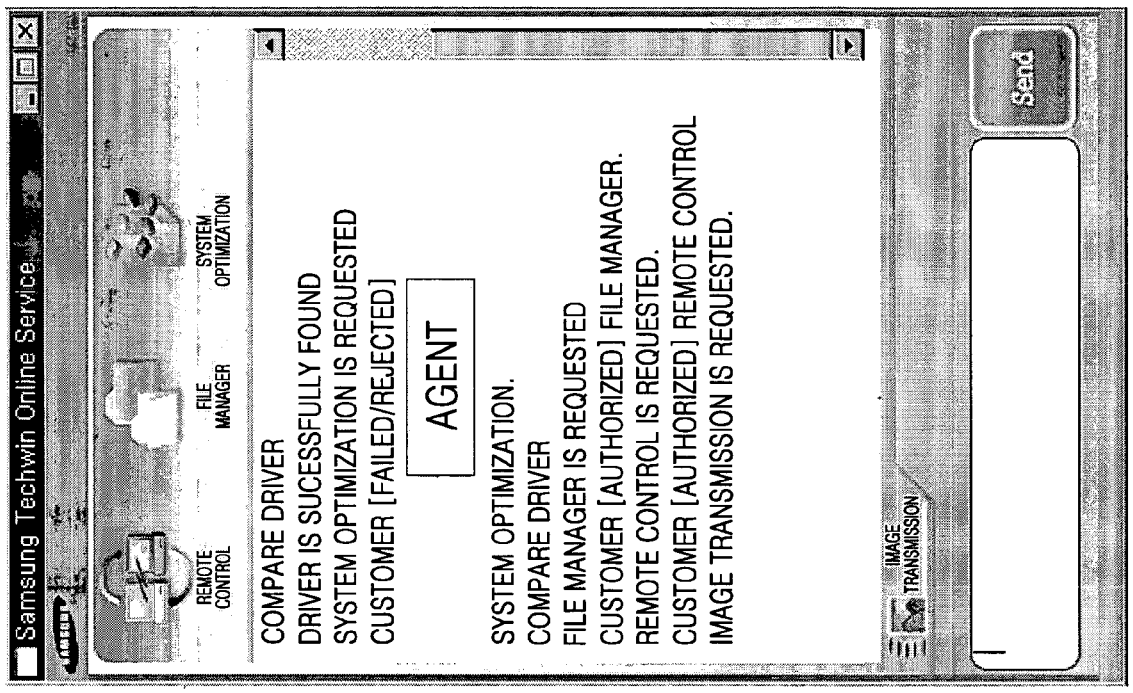
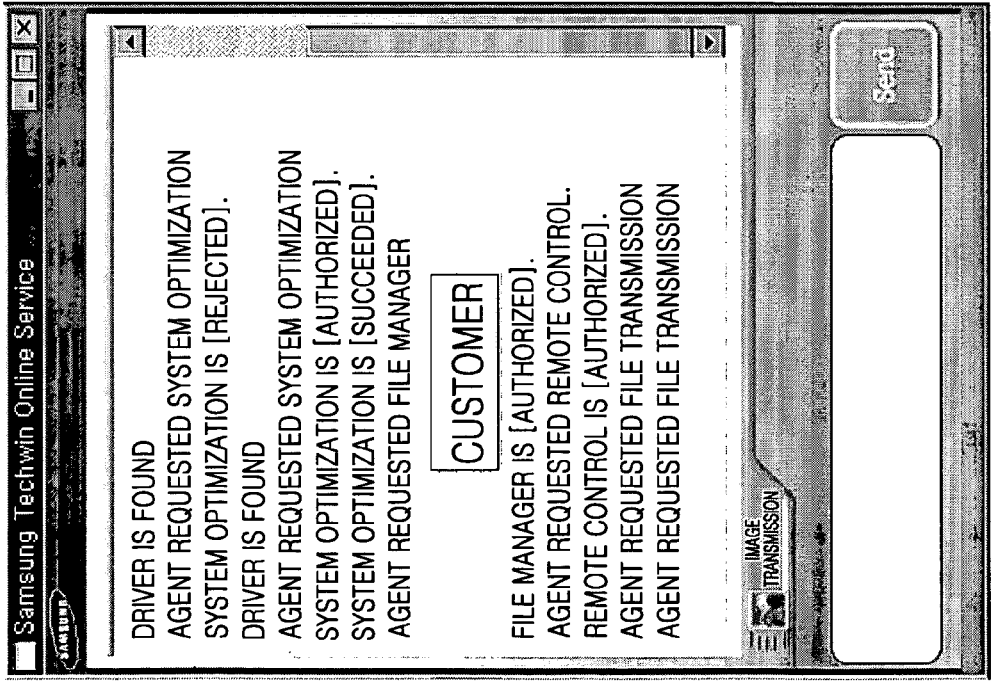

METHOD AND APPARATUS FOR REMOTELY PROVIDING DRIVER INFORMATION

BACKGROUND OF THE INVENTION

This application claims priority to Korean Patent Application No. 2004-18143, filed on Mar. 17, 2004, in the Korean Intellectual Property Office, the disclosure of which is incorporated herein in its entirety by reference.

1. Field of the Invention

The present invention relates to a method and apparatus for remotely providing driver information, and more particularly, to a method and apparatus for remotely detecting whether drivers necessary for running a device that is connected to a customer's computer are installed in the computer and, based on the detected result, transmitting the necessary drivers to the computer and/or removing unnecessary drivers installed in the computer.

2. Description of the Related Art

Generally, drivers are programs that interact with specific devices or software. For example, when a consumer buys a device such as a printer, a display device, a digital camera, or an MP3 player, the consumer is usually required to install drivers related to the device in his computer in order to use the device when it is connected to the computer.

To run the device properly, the correct drivers must be installed in the computer, and drivers that conflict with the correct drivers must be deleted. Otherwise, when a problem arises with the correct drivers, the consumer may not be able to easily diagnose and solve the problem.

SUMMARY OF THE INVENTION

According to an embodiment of the invention, there is provided a method, apparatus, and computer readable medium containing computer-readable code for remotely providing driver information, which includes the steps of: receiving information regarding a product that is communicatively linked to a customer's computer and system information regarding the customer's computer; determining, based on the received product information and system information, which driver or drivers are required for the product; determining which driver or drivers are already installed in the customer's computer; comparing the required drivers with the installed drivers; and based on the comparing step, transmitting to the customer's computer, information regarding which of the already-installed drivers are required for the product and which of the already-installed drivers are to be deleted; providing joint access to the remote server by: a) an agent, via the agent computer, that assists a customer using the customer computer, and b) the customer; installing a remote control module on the customer computer; connecting the customer computer to a computer of the agent; communicating with the agent in real time using a chat window via the remote control module; wherein the agent performs at least one of system optimization, remote control, file manager, image transmission, and text transmission via the remote control module; the method further comprising: providing a customer with a selection of a plurality of service types comprising a real-time service type, a designated service type, and a reservation service type; receiving a selection of service type from the customer; if a selection of real-time service type is received, performing the above-described steps of receiving information, determining which driver(s) is required, determining which driver(s) is already installed, comparing, and transmitting in real time via a communication network; if a selection of designated service type is received, performing steps a to e while the customer is in communication with an agent; and if a selection of reservation service type is received, performing above-identified steps of receiving information, determining which driver(s) is required, determining which driver(s) is already installed, comparing, and transmitting at a time indicated by the customer. Information regarding the performance of each step may be transmitted to the customer's computer in real time.

The information regarding the product may include the model name of the product, such as a digital camera model name. The system information may include information regarding an operating system of the customer's computer.

According to an aspect of the invention, the transmitting step is performed in response to an authorization signal input through the customer's computer. Also, an image of the product may be transmitted to the customer's computer.

According to yet another aspect of the invention, information regarding one or more drivers that are not installed in the customer's computer but that are necessary for running the product may be transmitted to the customer's computer.

The invention may be embodied in a computer-readable medium or a computer program product. Furthermore, the steps carried out in the various embodiments of the invention may be performed by an apparatus that includes a driver information generating module, a driver information comparison module, and a remote control module.

BRIEF DESCRIPTION OF THE DRAWINGS

The above and other features and advantages of the present invention will become more apparent by describing in detail exemplary embodiments thereof with reference to the attached drawings in which:

FIG. 9 illustrates a system optimization page when 'System Optimization' of FIG. 8 is selected;

FIG. 13 illustrates a job log displayed in the chat windows of the customer and the agent during the remote control of a computer of the customer.

DETAILED DESCRIPTION OF THE INVENTION

Figure 1:
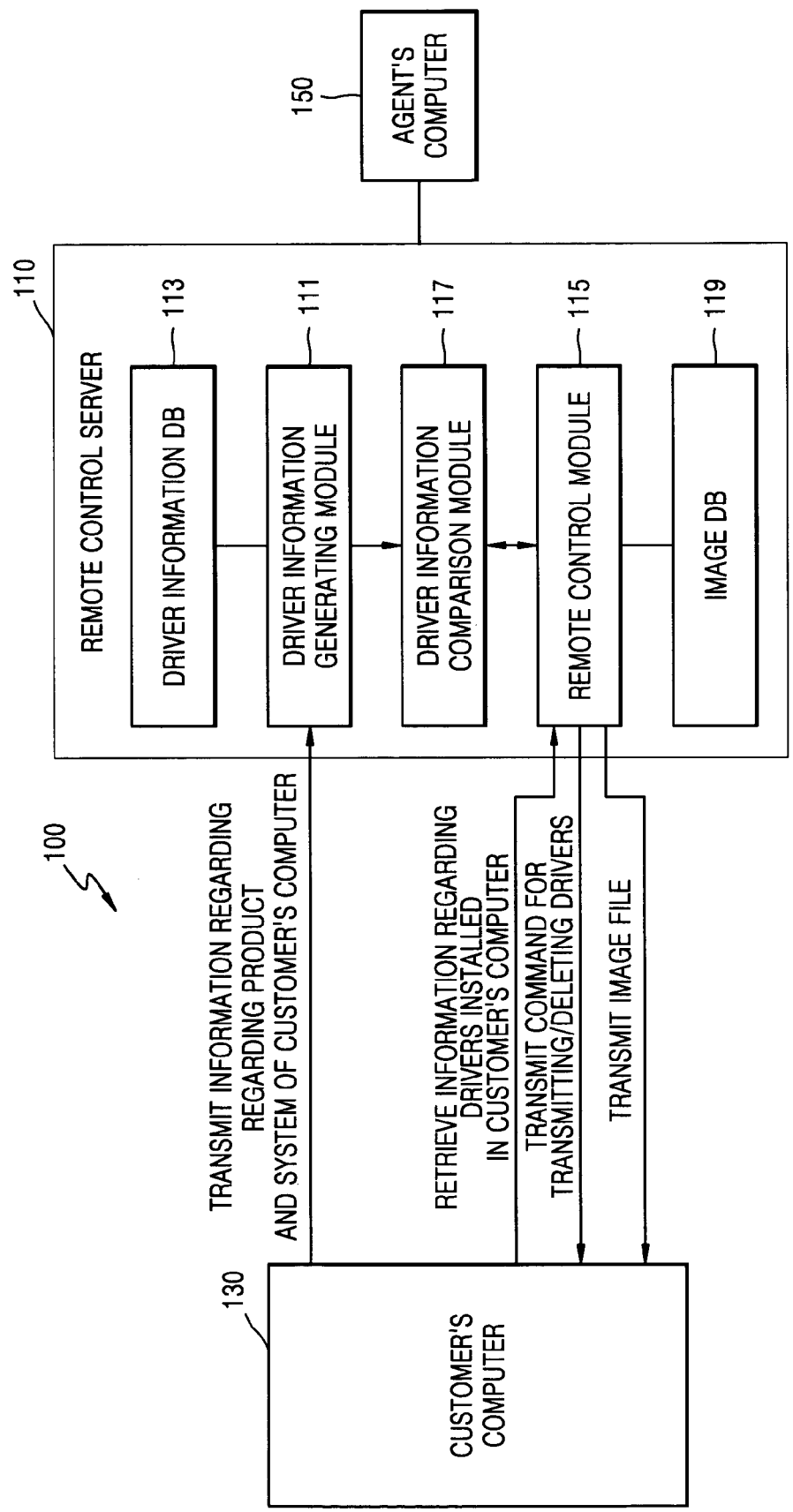
FIG. 1 is a block diagram of a remote control system according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art. Like reference numerals in the drawings denote like elements.

FIG. 1 is a block diagram of a remote control system 100 according to an embodiment of the present invention. A plurality of customers' computers and a plurality of agents' computers can access a remote control server 110 (or a remote control device) according to the present invention through a communications network. For the sake of convenience, FIG. 1 illustrates the remote control system 100 when one customer's computer 130 and one agent's computer 150 access the remote control server 110.

The remote control server 110 includes a driver information generating module 111, a driver information database 113, a remote control module 115, a driver information comparison module 117, and an image database 119. The driver information generating module 111, the remote control module 115, and the driver information comparison module 117 may be hardware, software, or a computer readable program code performing respective functions.

A customer can access the remote control server 110 through the customer's computer 130. Here, it is assumed that the customer is a registered user of the remote control server 110.

Figure 3:
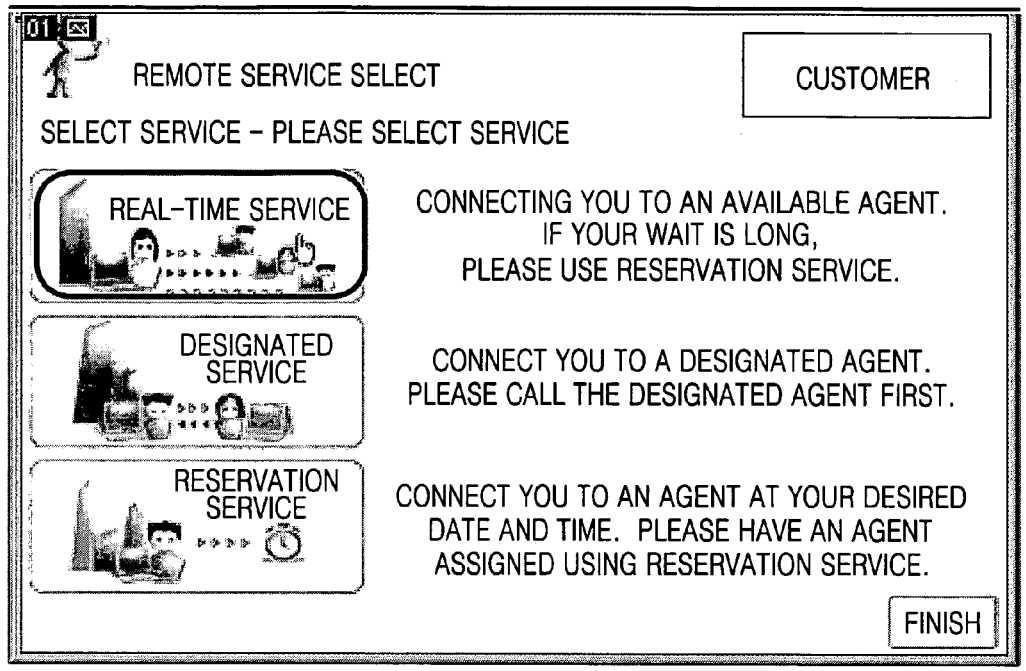
FIG. 3 is a remote service selection page displayed on a display device of a customer.

When the customer logs into the remote control server 110 through the customer's computer 130, the remote control server 110 transmits a remote control selection page, as illustrated in FIG. 3, to the customer's computer 130. The customer may select 'Real-time Service', 'Designated Service', or 'Reservation Service' on the remote control selection page.

When the 'Real-time Service' is selected, the remote control server 110 performs functions according to the present invention, which will later be described, in real time through the communications network. When the 'Designated Service' is selected, the remote control server 110 performs the functions while the customer is talking to an agent on the phone. When the 'Reservation Service' is selected, the remote control server 110 performs the functions at a time desired by the customer.

Figure 4:
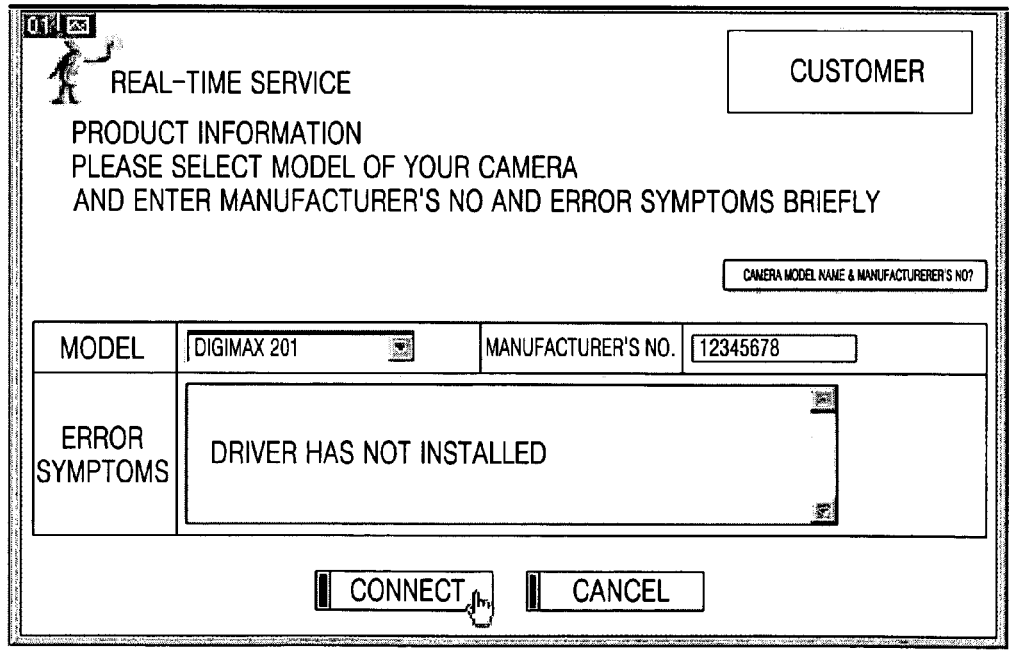
FIG. 4 is an interface page for inputting product information displayed on the display device of the customer.

FIG. 4 is an interface page for inputting product information displayed on a display device of the customer. Referring to FIGS. 1 and 4, when the customer enters a model name, a manufacturer's number, and error symptoms of a product (for example, a printer, a display device, a digital camera, or an MP3 player) to be connected to the customer's computer 130 and clicks the 'Connect' button, the customer's computer 130 transmits product data and system data to the driver information generating module 111 of the remote control server 110 through the communications network. The product data includes at least one of the model name, the manufacturer's number, or the error symptoms. The system data includes one or more of the following pieces of information regarding the customer's computer 130: the operating system (OS), the type of processor, IP address, memory, display resolution, video card, and the universal serial bus (USB) controller of the customer's computer 130. FIG. 9 illustrates these examples as well. Examples of the OS include Unix$^r$, Microsoft Windows 98, Microsoft Windows XP$^r$, Microsoft Windows 2000$^r$, VMS of DEC, OS/2 of IBM, AIX, and OS/390. The information on the OS may include the version and type of the operating system used.

The driver information generating module 111 generates information regarding a driver (or a driver file) necessary for running the product based on the product information and the system information that it receives.

When the information regarding the driver necessary for running the product is stored in the driver information database 113, the driver information generating module 111 combines the product information with the system information and, based on the result of the combination, retrieves the information regarding the driver (or the driver file) from the driver information database 113. When the driver information generating module 111 includes the driver information database 113, it can generate the driver information (or the driver file) by itself.

Figure 5:
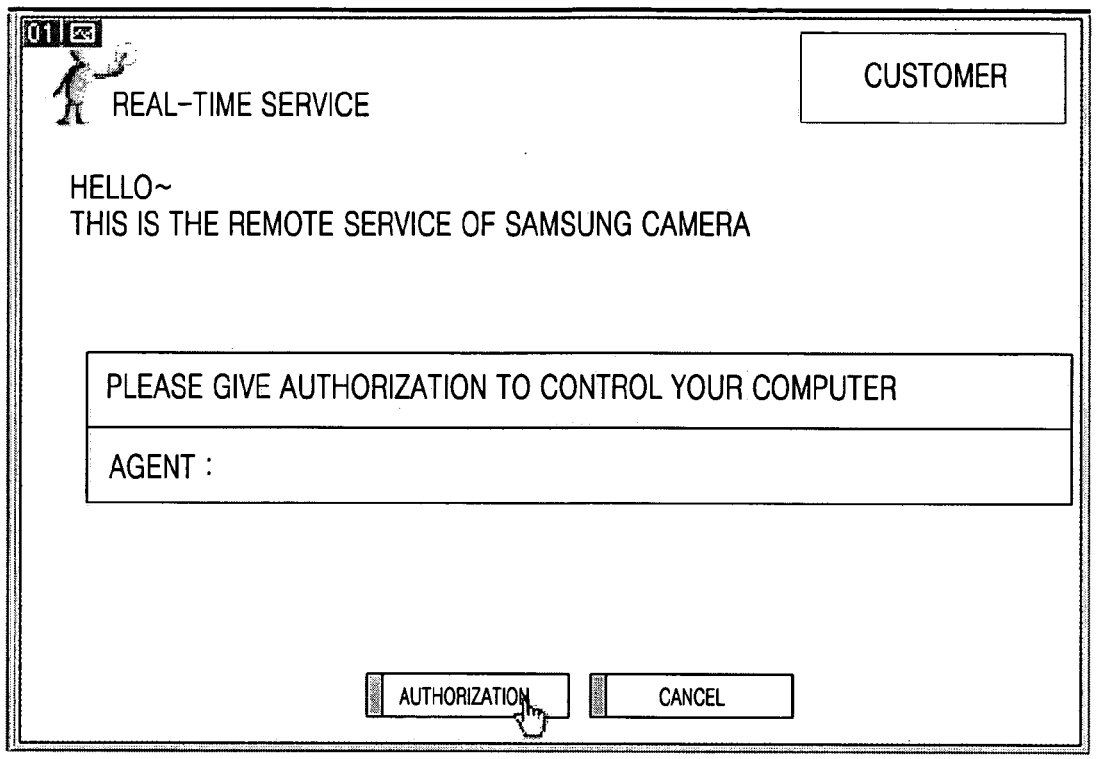
FIG. 5 is a dialog box displayed on the display device of the customer, requesting authorization for remote control.
Figure 6:
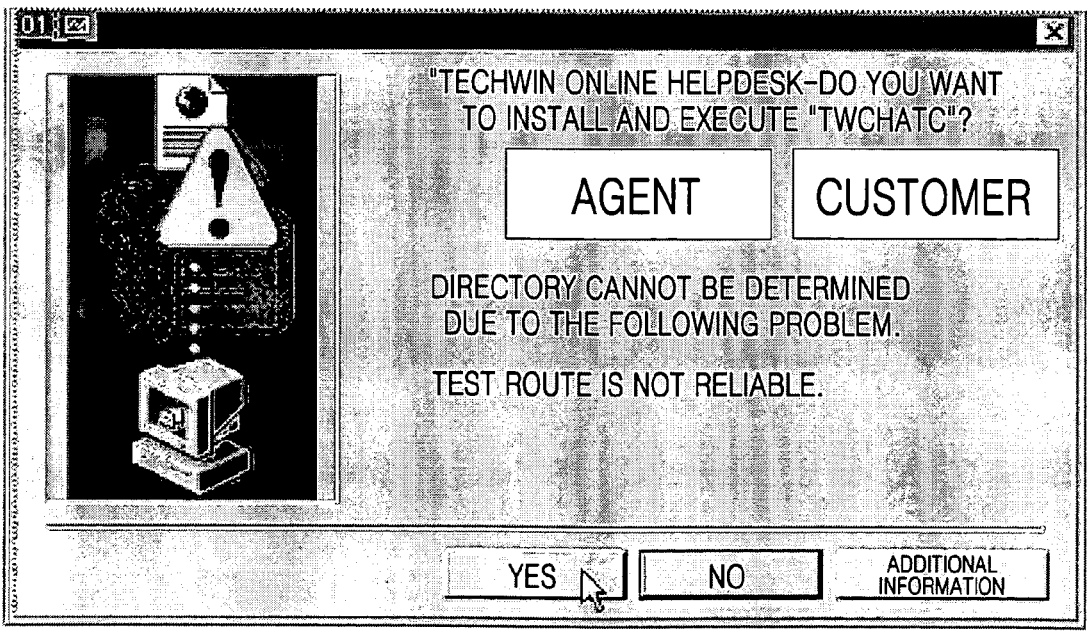
FIG. 6 is a dialog box confirming system installation for remote control.

FIG. 5 is a dialog box displayed on the display device of the customer, requesting authorization for remote control. FIG. 6 is a dialog box confirming system installation for remote control. Referring to FIGS. 1, 5, and 6, the remote control module 115 transmits the dialog box requesting authorization for remote control to the customer's computer 130. When the customer clicks the 'Authorization' button, the dialog box confirming system installation for remote control is displayed on the display devices of the customer's computer 130 and the agent's computer 150.

When the customer and/or the agent click the 'Yes' button, a system necessary for remote control is transmitted to the customer's computer 130 and/or the agent's computer 150 under the control of the remote control module 115. The system necessary for remote control may be a program running a chat window with which the customer can communicate with the agent in real time.

Figure 7:
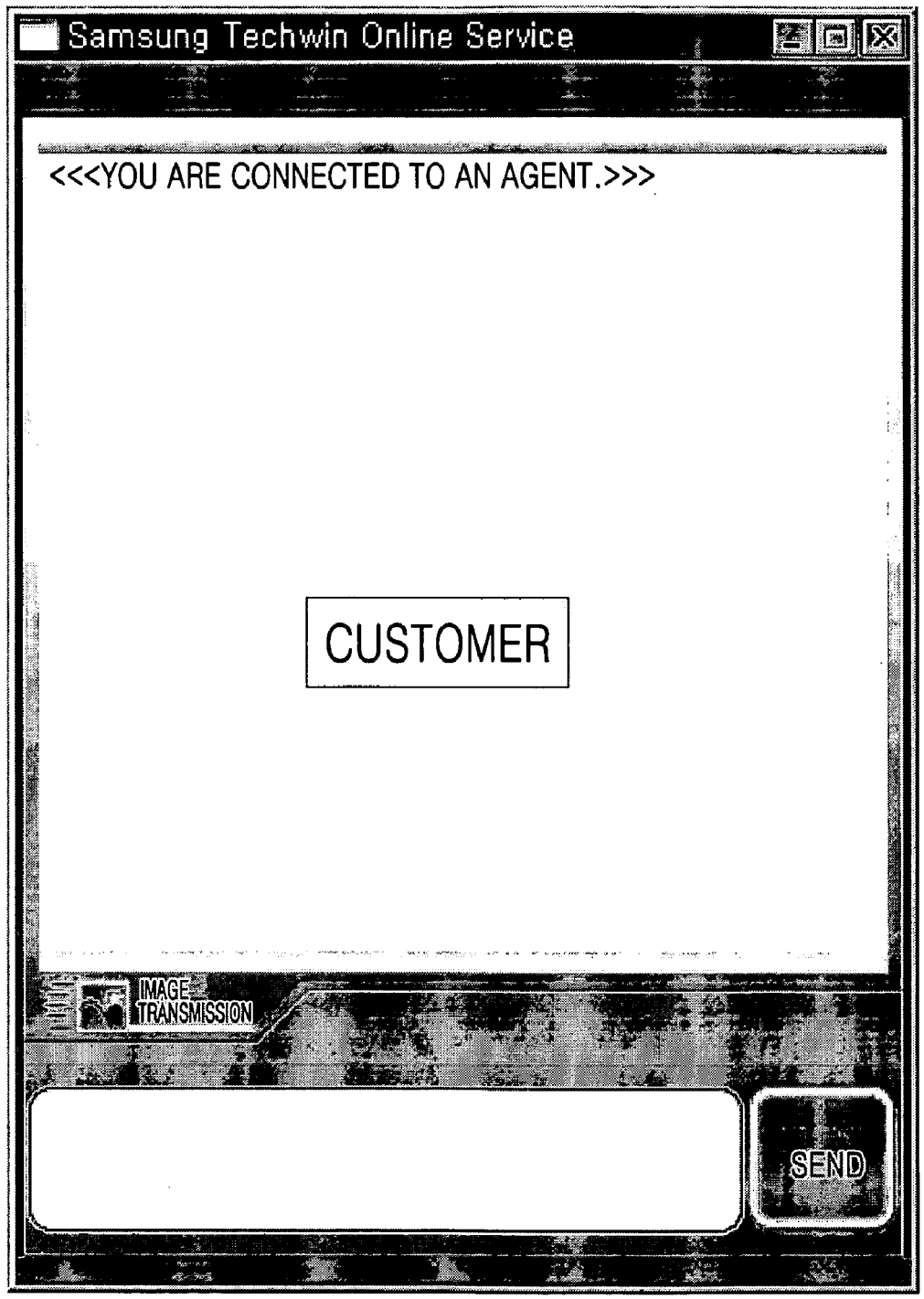
FIG. 7 is a chat window displayed on the display device of the customer when the customer is properly connected to an agent.

When the customer's computer 130 is properly connected to the agent's computer 150, a chat window is displayed on the display device of the customer's computer 130. FIG. 7 shows the chat window displayed on the display device of the customer's computer 130 when the customer's computer 130 is properly connected to the agent's computer 150.

Figure 8:
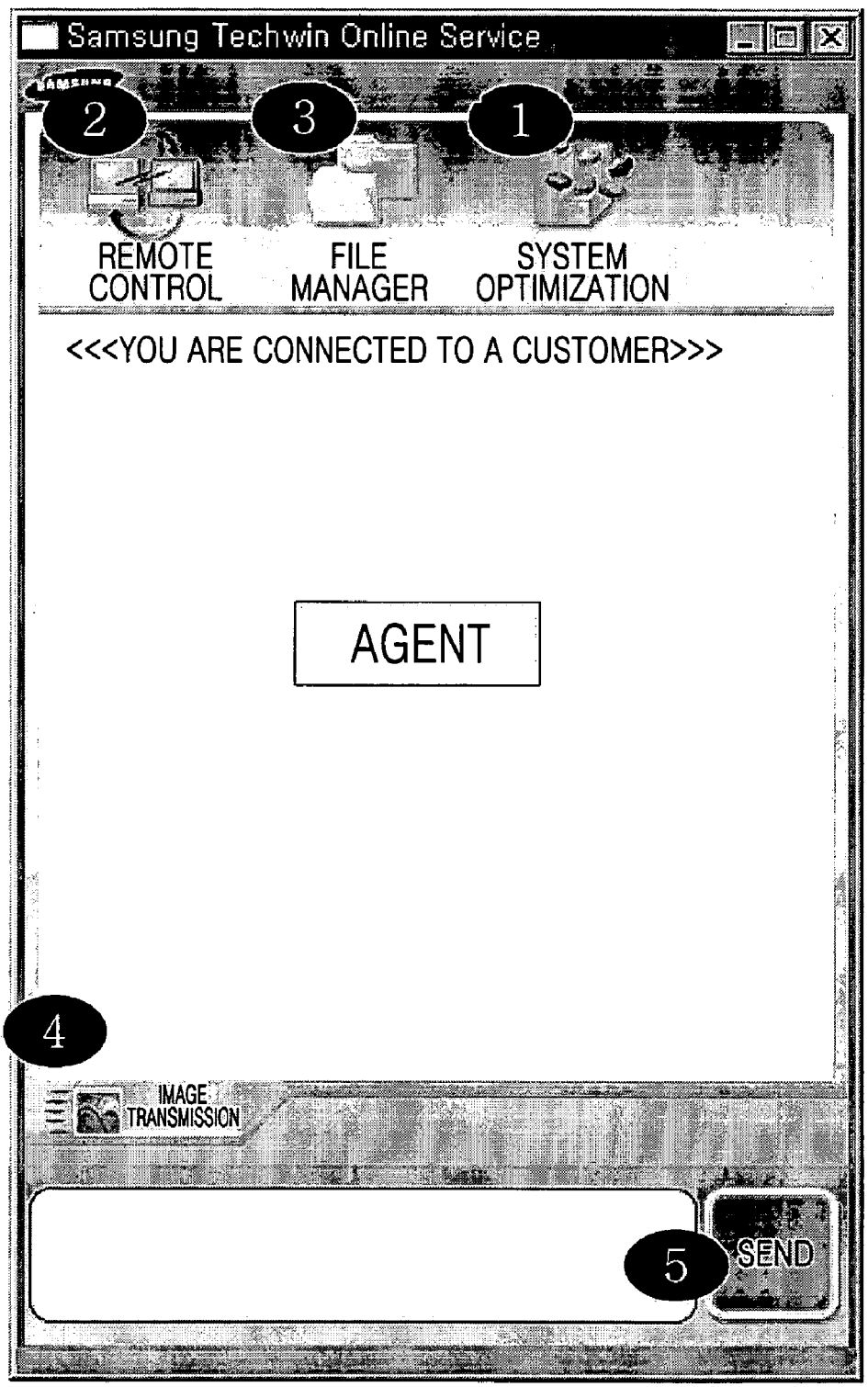
FIG. 8 is a chat window displayed on a display device of the agent.

When the customer's computer 130 is properly connected to the agent's computer 150, a chat window is displayed on the display device of the agent's computer 150. FIG. 8 shows the chat window displayed on the display device of the agent's computer 150.

Referring to FIG. 8, the agent may perform functions such as 'System Optimization,' 'Remote Control,' 'File Manager,' 'Image Transmission,' and 'Text Transmission' within the chat window. Each of these functions can be performed by the remote control module 115.

Figure 2:
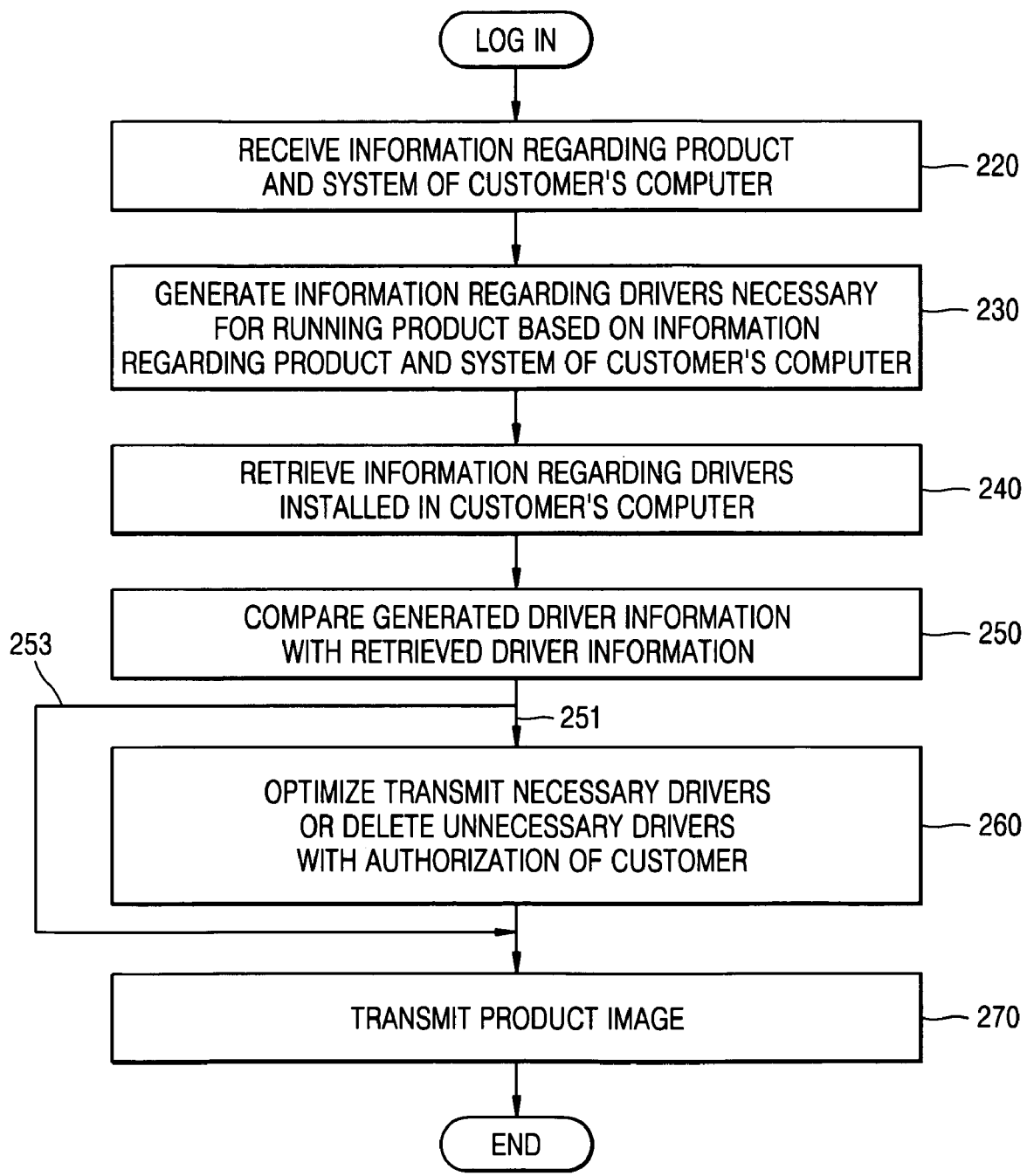
FIG. 2 is a flow chart illustrating a remote control method according to an embodiment of the present invention.

The 'System Optimization' of the customer's computer 130 according to the present invention will now be described with reference to FIGS. 1, 2, and 9. After the log-in process, the customer inputs the product data. In other words, the customer inputs at least one of a model name, a manufacturer's number, or error symptoms of the product to be connected to the customer's computer 130, as illustrated in FIG. 4.

The driver information generating module 11 receives the product data (for example, a model name) and information regarding the customer's computer 130 (i.e. the system data) (Operation 220), searches the driver information database 113 based on the received information, and generates information regarding necessary and unnecessary drivers for running the product (Operation 230). Then, the product data and system data is displayed on the display device of the agent's computer 150. For example, the model name shown in the 'Model Name' field ①, the operating system shown in the 'OS' field ③, and a driver shown in the 'Selected Driver' list ⑤ of FIG. 9 may be displayed on the display device of the agent's computer 150.

Referring again to FIG. 9, when the agent clicks the 'Compare' button, the remote control module 115 retrieves information regarding at least one of the drivers installed in the customer's computer 130 (Operation 240). The remote control module 115 compares the driver information generated through Operation 230 with the retrieved information through Operation 240 (Operation 250). Asterisks marked in the 'Installed Driver' list ⑥ indicate that drivers necessary for running the product are installed in the customer's computer 130. In other words, drivers necessary for running the product are marked with asterisks, and unnecessary drivers are not marked with asterisks.

Figure 12:
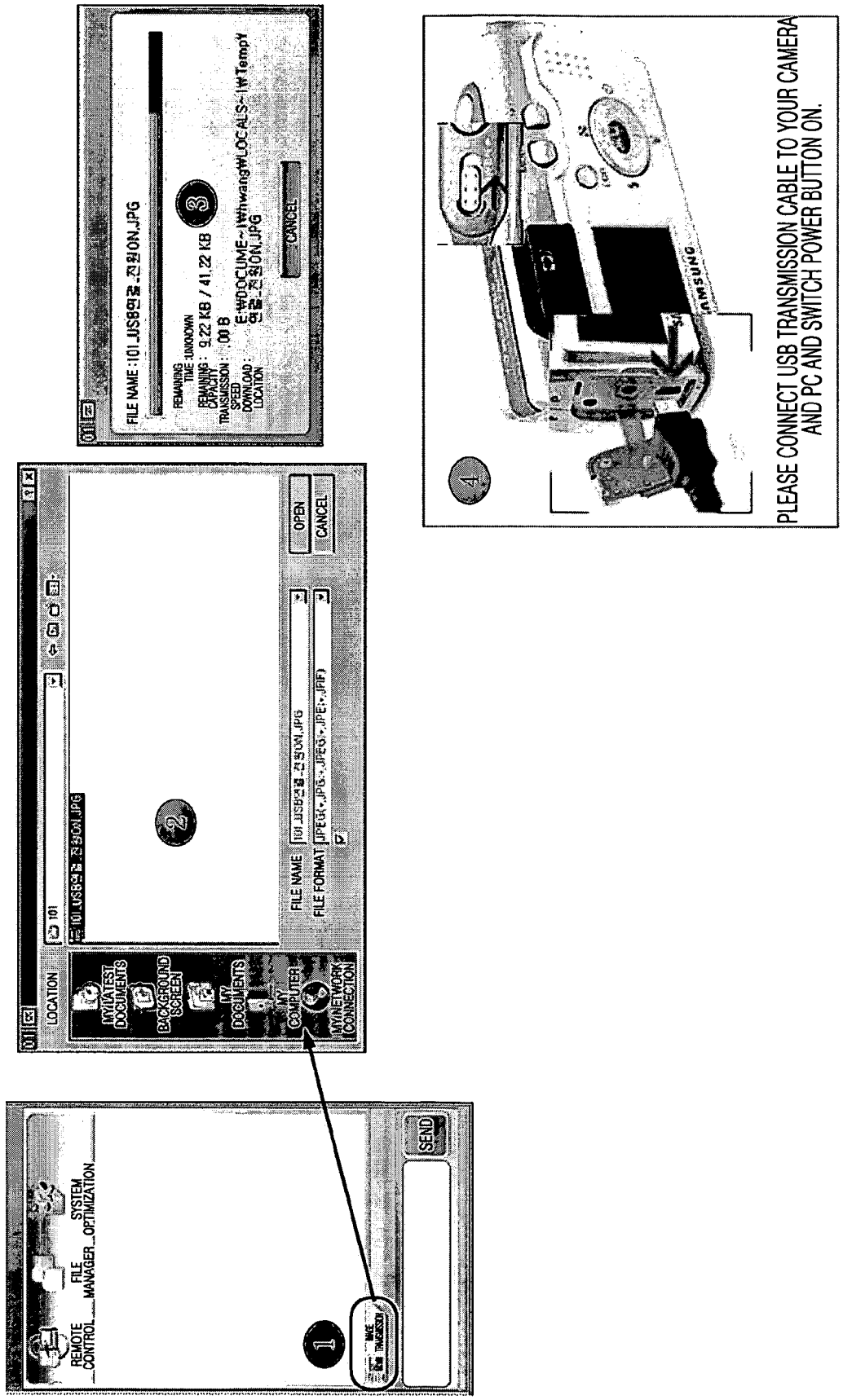
FIG. 12 illustrates an image transmission page when 'Image Transmission' of FIG. 8 is selected.

As a result of Operation 250, if at least one of the drivers installed in the customer's computer 130 is found to be necessary for running the product, when the agent clicks the 'Image Transmission' button ⊙of FIG. 8, the remote control module 115 transmits an image file of the product to the customer's computer 130 following a procedure illustrated in FIG. 12 (Operations 253 and 270). Then, the customer can connect the product to the customer's computer 130 while referring to the image displayed on the customer's computer 130.

As a result of Operation 250, when the agent decides to transmit a command for transmitting information regarding at least one of the drivers not installed in the customer's computer 130 and necessary for running the product and/or a command for deleting information regarding at least one of the drivers installed in the customer's computer 130 and unnecessary for running the product, the agent clicks the 'Optimize' button 8 of FIG. 9.

The remote control module 115 transmits a dialog box ⊙(or a signal) requesting authorization for optimisation to the customer's computer 130. If the customer clicks the 'Yes' button, the remote control module 260 transmits to the customer's computer 130 (a) one or more commands for transmitting the information regarding at least one of the drivers not installed in the customer's computer 130 and necessary for running the product, and/or (b) the command for deleting the information regarding at least one of the drivers installed in the customer's computer 130 and unnecessary for running the product. In response to the command or commands, the customer's computer 130 deletes a driver or installs a received driver (Operation 260). The agent then performs Operation 270 as described above.

When the agent clicks the 'Search Model' button ② of FIG. 9, the remote control module 115 retrieves information (for example, a model name) about products that were connected to the customer's computer 130 in the past and displays the information on the display device of the agents computer 150, as illustrated in 'Model Found' list ⑦ of FIG. 9. Therefore, the agent can obtain information regarding the products that were installed in the customer's computer 130 in the past. When the agent clicks a model name of the product in the 'Model Found' list ⑦, the 'Model Name' ① and the 'Selected Driver' list ⑥ are changed accordingly.

Therefore, when drivers necessary for running the product are not installed in the customer's computer 130, the remote control server 110, according to an embodiment of the invention, transmits the necessary drivers to the customer's computer 130. When drivers unnecessary for running the product are installed in the customer's computer 130, the remote control server 110, using an embodiment of the remote control method, deletes the unnecessary drivers. In this regard, optimal drivers for running the product may be installed in the customer's computer 130.

Figure 10:
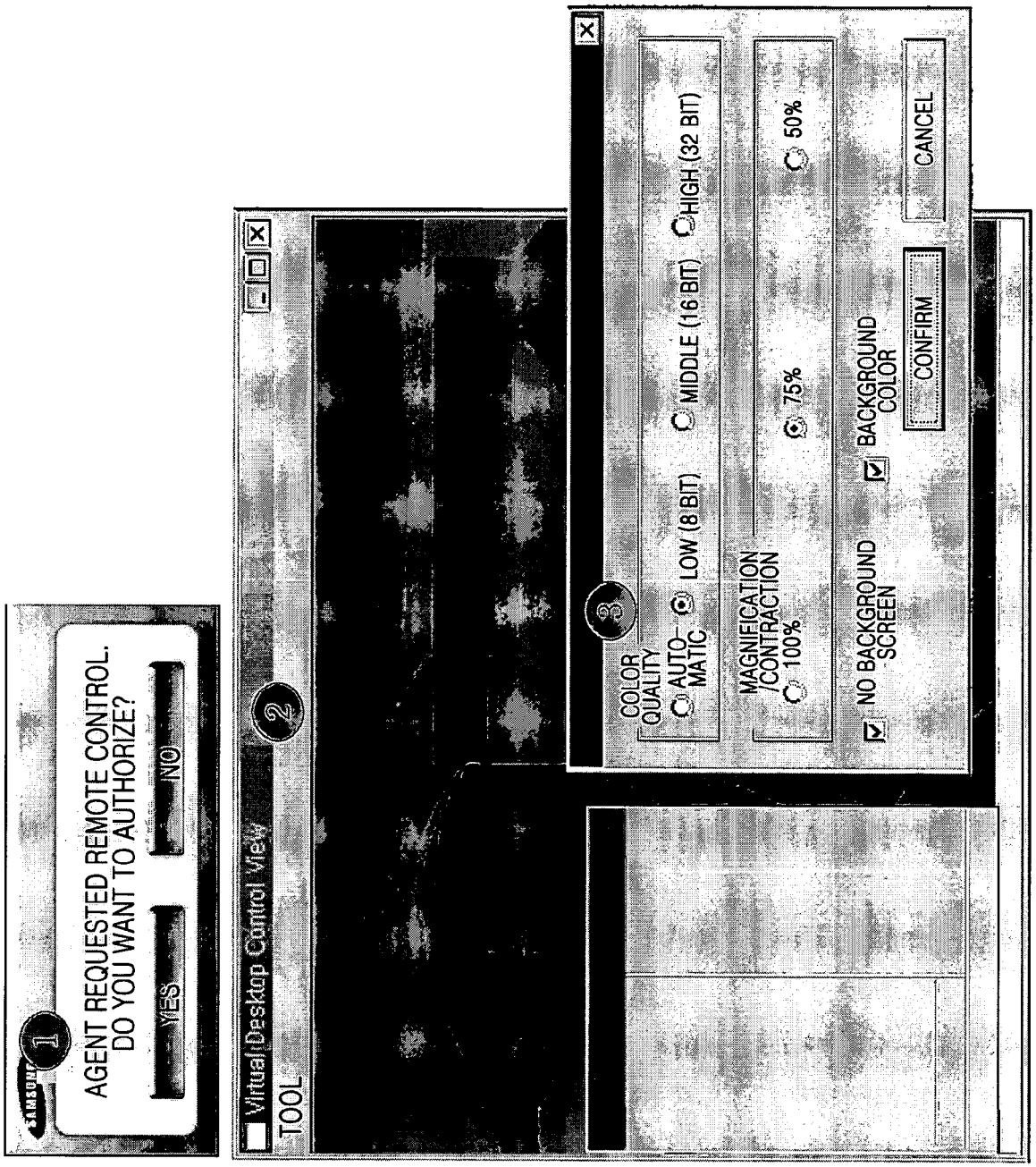
FIG. 10 illustrates a remote control page when 'Remote Control' of FIG. 8 is selected.

FIG. 10 illustrates a remote control page that is displayed when the 'Remote Control' button ⊙of FIG. 8 is selected.

Referring to FIGS. 1, 8, and 10, when the agent clicks the 'Remote Control' button in the chat window of FIG. 8, the remote control module 111 transmits a dialog box (or a signal) requesting authorization for remote control to the customer's computer 130. When the customer clicks the 'Yes' button, a remote control window ② of FIG. 10 is executed. The agent can remotely control the customer's computer 130 using the remote control window ②. For example, with the authorization of the customer, the agent using the agent's computer 150 may transmit a driver to the customers computer 130 or delete a driver installed in the customer's computer.

The agent may change the environment of the remote control window ② according to his working environment. For example, as shown in FIG. 10, the agent change the environment of the remote control window ② using a setup control ③.

Figure 11:
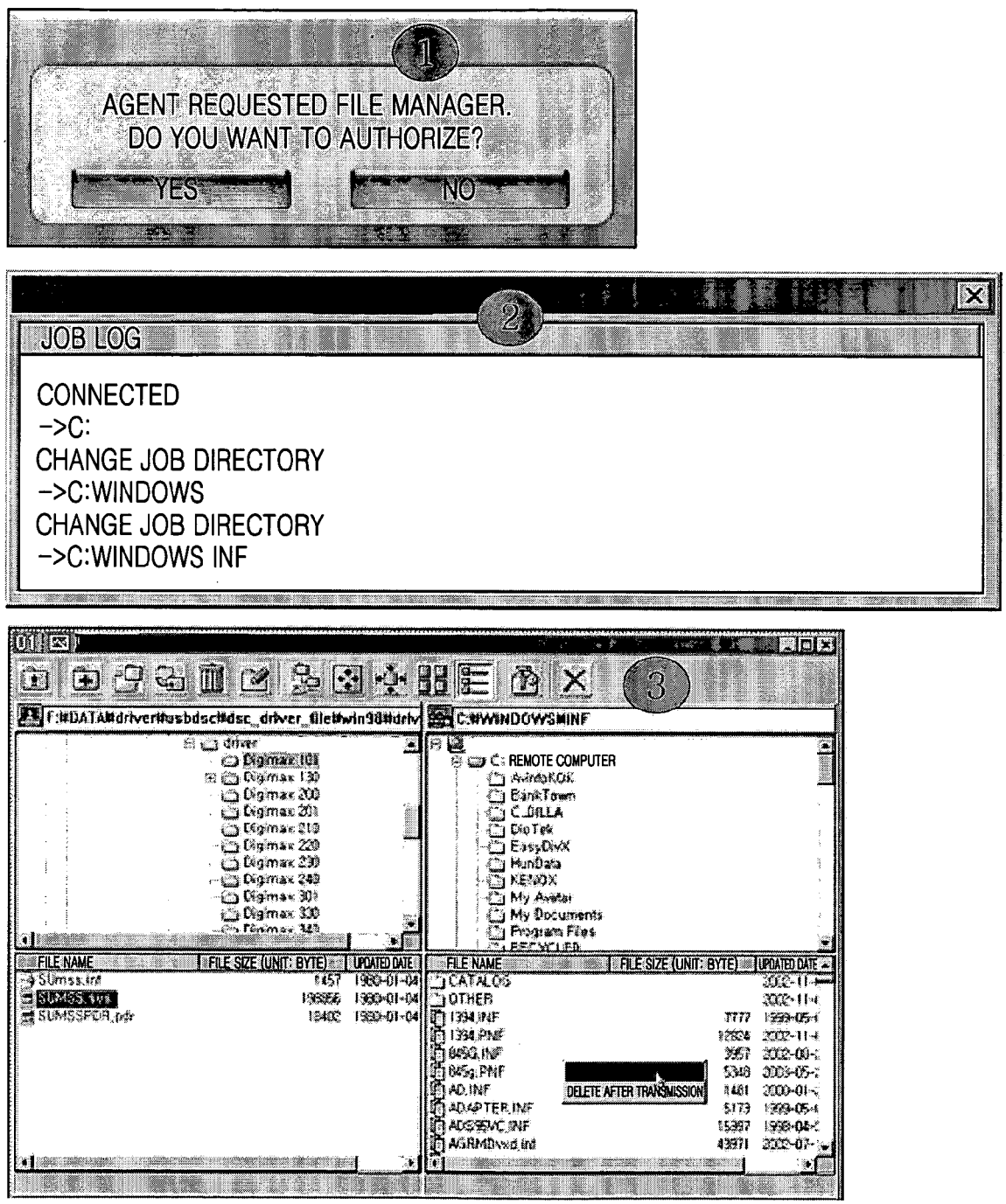
FIG. 11 illustrates a file manager page when 'File Manager' of FIG. 8 is selected.

FIG. 11 illustrates a file manager page that is displayed on the display device of the agent's computer 150 when the 'File Manager' button ⊙of FIG. 8 is selected. Referring to FIGS. 1, 8, and 11, when the agent clicks the 'File Manager' button ⊙in the chat window of FIG. 8, the remote control module 111 transmits a dialog box requesting authorization for file manager to the customer's computer 130. When the customer clicks the 'Yes' button, the 'File Manager' is executed. The customer can see what the agent is performing in a control window ② of FIG. 11.

The agent interacts with the file manager via a job window ③ shown in FIG. 11. The function of the file manager is the same as a Windows search engine. When the agent wants to delete a file in the customer's computer 130, the agent must obtain authorization from the customer.

FIG. 12 illustrates an image transmission page that is displayed when the 'Image Transmission' button ⊙of FIG. 8 is selected. Referring to FIGS. 1 and 12, when the agent clicks the 'Image Transmission' button ⊙of FIG. 8, locates an image to be transmitted to the customer's computer 130, and clicks the 'Open' button, an image file corresponding to the image is transmitted to the customers computer 130 (Operation 270 of FIG. 2).

Referring to of FIG. 12, the customer can learn how to operate each model of the product by following directions specified in the image file ④ transmitted to the customer's computer 130.

FIG. 13 illustrates a job log displayed in the chat windows of the customer and the agent during the remote control of the customer's computer. Referring to FIG. 12, jobs being performed by the agent are displayed on the chat window in real time.

Embodiments of the present invention may include programs operable in a computer system or computer-readable program codes recordable in a recording medium. In addition, a program may be read from a computer-readable recording medium and executed in a general digital computer system. Possible recording mediums includes a magnetic recording medium (for example, a ROM, a floppy disc, or a hard disc), an optical storage medium (for example, a CD-ROM or a DVD), and a carrier wave (for example, an Internet transmission).

As described above, a remote control method and apparatus according to the present invention may transmit drivers necessary for running a product to a customer's computer when the necessary drivers are not installed in the customer's computer and delete unnecessary drivers installed in the customer's computer. This allows optimal drivers necessary for running the product to be installed in the customer's computer.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for remotely providing driver information, the method comprising:
   a. receiving information regarding a product that is communicatively linked to a customer's computer and system information regarding the customer's computer;
   b. determining, based on the received product information and system information, which driver or drivers are required for the product;
   c. determining which driver or drivers are already installed in the customer's computer;
   d. comparing the required drivers with the installed drivers; and
   e. based on the comparing step, transmitting to the customer's computer, information regarding which of the already-installed drivers are required for the product and which of the already-installed drivers are to be deleted;
   wherein steps a to e are performed on a remote server;
   the method further comprising:
      providing joint access to the remote server by: a) an agent, via the agent computer, that assists a customer using the customer computer, and b) the customer;
      installing a remote control module on the customer computer;
      connecting the customer computer to a computer of the agent;
      communicating with the agent in real time using a chat window via the remote control module;
      wherein the agent performs at least one of system optimization, remote control, file manager, image transmission, and text transmission via the remote control module;
   the method further comprising:
      providing a customer with a selection of a plurality of service types comprising a real-time service type, a designated service type, and a reservation service type;
      receiving a selection of service type from the customer;
      if a selection of real-time service type is received, performing steps a to e in real time via a communication network;
      if a selection of designated service type is received, performing steps a to e while the customer is in communication with an agent; and
      if a selection of reservation service type haste is received, performing steps a to e at a time indicated by the customer.

2. The method of claim 1, wherein the information regarding the product comprises a model name of the product.

3. The method of claim 1, wherein the information regarding the product comprises a model name of a digital camera.

4. The method of claim 1, wherein the system information comprises information regarding an operating system of the customer's computer.

5. The method of claim 1, wherein the transmitting step is performed in response to an authorization signal input through the customer's computer.

6. The method of claim 1, further comprising transmitting an image of the product to the customer's computer.

7. The method of claim 1, further comprising transmitting the result of each step to the customer's computer in real time.

8. The method of claim 1, further comprising transmitting to the customer's computer information regarding one or more drivers that are not installed in the customer's computer but that are necessary for running the product.

9. A computer-readable recording medium having recorded thereon computer-readable instructions for performing steps comprising:
   receiving information regarding a product that is communicatively linked to a customer's computer and system information regarding the customer's computer;
   determining, based on the received product information and system information, which driver or drivers are required for the product;
   determining which driver or drivers are already installed in the customer's computer;
   comparing the required drivers with the installed drivers; and
   based on the comparing step, transmitting to the customer's computer, information regarding which of the already-installed drivers are required for the product and which of the already-installed drivers are to be deleted;
   wherein the receiving, determining, comparing, and transmitting steps are performed on a remote server;
   providing joint access to the remote server by: a) an agent, via the agent computer, that assists a customer using the customer computer, and b) the customer;
   installing a remote control module on the customer computer;
   connecting the customer computer to a computer of the agent;
   communicating with the agent in real time using a chat window via the remote control module;
   wherein the agent performs at least one of system optimization, remote control, file manager, image transmission, and text transmission via the remote control module;
   providing a customer with a selection of a plurality of service types comprising a real-time service type, a designated service type, and a reservation service type;
   receiving a selection of service type from the customer;
   if a selection of real-time service type is received, performing steps a to e in real time via a communication network;
   if a selection of designated service type is received, performing steps a to e while the customer is in communication with an agent; and
   if a selection of reservation service type haste is received, performing steps a to e at a time indicated by the customer.

10. The computer-readable recording medium of claim 9, wherein the information regarding the product comprises a model name of the product.

11. The computer-readable recording medium of claim 9, wherein the information regarding the product comprises a model name of a digital camera.

12. The computer-readable recording medium of claim 9, wherein the system information comprises information regarding an operating system of the customer's computer.

13. The computer-readable recording medium of claim 9, wherein the transmitting step is performed in response to an authorization signal input through the customer's computer.

14. The computer-readable recording medium of claim 9, further comprising transmitting an image of the product to the customer's computer.

15. The computer-readable recording medium of claim 9, further comprising transmitting the result of each step to the customer's computer in real time.

16. The computer-readable recording medium of claim 9, further comprising transmitting to the customer's computer information regarding one or more drivers that are not installed in the customer's computer but that are necessary for running the product.

17. A remote control apparatus comprising a remote server having a processor, wherein the processor comprises:
   a driver information generating module that performs steps comprising:
   a) receiving information regarding a product that is communicatively linked to a customer's computer and system information regarding the customer's computer, and
   b) determining, based on the received product information and system information, which driver or drivers are required for the product;
   a driver information comparison module that performs steps comprising:
   c) comparing the required drivers with the installed drivers;
   a remote control module that performs steps comprising
   d) determining which driver or drivers are already installed in the customer's computer; and
   e) based on the comparing step performed by the driver information module, transmitting to the customer's computer information regarding which of the already-installed drivers are required for the product and which of the already-installed drivers are to be deleted;
   a joint access element for providing joint access to the remote server by: a) an agent, via the agent computer, that assists a customer using the customer computer, and b) the customer;
   an installation element for installing a remote control module on the customer computer;
   a connection for connecting the customer computer to a computer of the agent;
   a communication element for communicating with the agent in real time using a chat window via the remote control module;
   wherein the agent performs at least one of system optimization, remote control, file manager, image transmission, and text transmission via the remote control module;
   a selection element for providing a customer with a selection of a plurality of service types comprising a real-time service type, a designated service type, and a reservation service type;
   a receiving element for receiving a selection of service type from the customer;
   wherein the algorithm further comprises:
   an algorithm for, if a selection of real-time service type is received, performing steps a to e in real time via a communication network;
   an algorithm for, if a selection of designated service type is received, performing steps a to e while the customer is in communication with an agent; and
   an algorithm for, if a selection of reservation service type is received, performing steps a to e at a time indicated by the customer.

18. The apparatus of claim 17, wherein the information regarding the product comprises a model name of the product.

19. The apparatus of claim 17, wherein the information regarding the product comprises a model name of a digital camera.

20. The apparatus of claim 17, wherein the system information comprises information regarding an operating system of the customer's computer.

21. The apparatus of claim 17, wherein the remote control module performs the transmitting step in response to an authorization signal input through the customer's computer.

22. The apparatus of claim 17, wherein the remote control module performs a further step comprising transmitting an image of the product to the customer's computer.

23. The apparatus of claim 17, wherein the remote control module performs a further step comprising transmitting the result of each step to the customer's computer in real time.

24. The apparatus of claim 17, wherein the remote control module performs a further step comprising transmitting to the customer's computer information regarding one or more drivers that are not installed in the customer's computer but that are necessary for running the product.

* * * * *

UNITED STATES PATENT AND TRADEMARK OFFICE
CERTIFICATE OF CORRECTION

PATENT NO.       : 7,634,769 B2                                                        Page 1 of 1
APPLICATION NO.  : 10/898121
DATED            : December 15, 2009
INVENTOR(S)      : Han et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1544 days.

Signed and Sealed this

Ninth Day of November, 2010

David J. Kappos
*Director of the United States Patent and Trademark Office*